(12) United States Patent  (10) Patent No.: US 7,499,932 B2
Mazzagatti et al.  (45) Date of Patent: Mar. 3, 2009

(54) ACCESSING DATA IN AN INTERLOCKING TREES DATA STRUCTURE USING AN APPLICATION PROGRAMMING INTERFACE

(75) Inventors: Jane Campbell Mazzagatti, Blue Bell, PA (US); Jane Van Keuren Claar, Bethlehem, PA (US)

(73) Assignee: Unisys Corporation, Blue Bell, PA (US)

( * ) Notice: Subject to any disclaimer, the term of this patent is extended or adjusted under 35 U.S.C. 154(b) by 500 days.

(21) Appl. No.: 11/258,292

(22) Filed: Oct. 24, 2005

(65) Prior Publication Data

US 2007/0038654 A1 Feb. 15, 2007

(51) Int. Cl.
G06F 17/30 (2006.01)
(52) U.S. Cl. .............................. 707/101; 707/3; 707/10
(58) Field of Classification Search .................. None
See application file for complete search history.

(56) References Cited

U.S. PATENT DOCUMENTS

| | | | |
|---|---|---|---|
| 4,286,330 A | 8/1981 | Isaacson | |
| 5,245,337 A | 9/1993 | Bugajski | |
| 5,293,164 A | 3/1994 | Bugajski | |
| 5,592,667 A | 1/1997 | Bugajski | |
| 5,630,125 A | 5/1997 | Zellweger | |
| 5,634,133 A | 5/1997 | Kelley | |
| 5,829,004 A | 10/1998 | Au | |
| 5,894,311 A | 4/1999 | Jackson | |
| 5,918,229 A | 6/1999 | Davis et al. | |
| 5,930,805 A | 7/1999 | Marquis | |
| 5,963,965 A | 10/1999 | Vogel | |
| 5,966,709 A | 10/1999 | Zhang | |
| 5,970,490 A | 10/1999 | Morgenstern | |
| 5,978,794 A | 11/1999 | Agrawal et al. | |

(Continued)

FOREIGN PATENT DOCUMENTS

EP 0 079 465 1/1985

(Continued)

OTHER PUBLICATIONS

Gschia-Yuan Teng & David L. Neuhoff, "An Improved Hierarchical Lossless Text Compression Algrithm", Proceedings 1995 Data Compression Conference.

(Continued)

*Primary Examiner*—Khanh B Pham
(74) *Attorney, Agent, or Firm*—Richard J. Gregson; Robert P. Marley; Susan C. Murphy

(57) ABSTRACT

A method for transmitting information in a KStore system having a KStore, an application programming interface and an application layer wherein the information is transmitted between the KStore and the application layer includes transmitting the information between the KStore and the application layer by way of the application programming interface. The KStore is constrained by way of the application programming interface with at least one constraint to provide at least one selected K path. The KStore is focused to provide a further selected K path. At least one KStore parameter is determined in accordance with the selected K path to provide at least one determined K parameter. The constraining of the KStore includes traversing the at least one selected K path.

38 Claims, 11 Drawing Sheets

U.S. PATENT DOCUMENTS

| | | | |
|---|---|---|---|
| 5,983,232 | A | 11/1999 | Zhang |
| 6,018,734 | A | 1/2000 | Zhang |
| 6,029,170 | A | 2/2000 | Garger |
| 6,031,993 | A | 2/2000 | Andrews et al. |
| 6,102,958 | A | 8/2000 | Meystel |
| 6,115,715 | A | 9/2000 | Traversat et al. |
| 6,138,115 | A | 10/2000 | Agrawal et al. |
| 6,138,117 | A | 10/2000 | Bayardo |
| 6,144,962 | A | 11/2000 | Weinberg et al. |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,356,902 | B1 | 3/2002 | Tan et al. |
| 6,360,224 | B1 | 3/2002 | Chickering |
| 6,373,484 | B1 | 4/2002 | Orell et al. |
| 6,381,600 | B1 | 4/2002 | Lau |
| 6,389,406 | B1 | 5/2002 | Reed et al. |
| 6,394,263 | B1 | 5/2002 | McCrory |
| 6,449,627 | B1 * | 9/2002 | Baer et al. ............... 715/206 |
| 6,453,314 | B1 | 9/2002 | Chan et al. |
| 6,470,277 | B1 | 10/2002 | Chin et al. |
| 6,470,344 | B1 | 10/2002 | Kothuri et al. |
| 6,473,757 | B1 | 10/2002 | Garofalakis et al. |
| 6,477,683 | B1 | 11/2002 | Killian et al. |
| 6,499,026 | B1 | 12/2002 | Rivette et al. |
| 6,505,184 | B1 | 1/2003 | Reed et al. |
| 6,505,205 | B1 | 1/2003 | Kothuri et al. |
| 6,574,635 | B2 * | 6/2003 | Stauber et al. .......... 707/103 R |
| 6,581,063 | B1 | 6/2003 | Kirkman |
| 6,591,272 | B1 | 7/2003 | Williams |
| 6,592,627 | B1 * | 7/2003 | Agrawal et al. ............ 715/234 |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1 | 10/2003 | Burkett et al. |
| 6,643,652 | B2 * | 11/2003 | Helgeson et al. ............. 707/10 |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 | 3/2004 | Klein et al. |
| 6,711,585 | B1 | 3/2004 | Copperman et al. |
| 6,745,194 | B2 | 6/2004 | Burrows |
| 6,748,378 | B1 | 6/2004 | Lavender et al. |
| 6,751,622 | B1 | 6/2004 | Puri et al. |
| 6,760,720 | B1 | 7/2004 | De Bellis |
| 6,768,995 | B2 | 7/2004 | Their et al. |
| 6,769,124 | B1 | 7/2004 | Schoening et al. |
| 6,799,184 | B2 | 9/2004 | Bhatt et al. |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,920,608 | B1 | 7/2005 | Davis |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,027,052 | B1 | 4/2006 | Thorn et al. |
| 7,228,296 | B2 | 6/2007 | Matsude |
| 2002/0124003 | A1 | 9/2002 | Rajasekaran et al. |
| 2002/0138353 | A1 | 9/2002 | Schreiber et al. |
| 2002/0143735 | A1 | 10/2002 | Ayi et al. |
| 2002/0143783 | A1 | 10/2002 | Bakalash et al. |
| 2002/0188613 | A1 | 12/2002 | Chakraborty et al. |
| 2002/0194173 | A1 | 12/2002 | Bjornson et al. |
| 2003/0009443 | A1 | 1/2003 | Yatviskly |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein |
| 2003/0204513 | A1 | 10/2003 | Burnbulis |
| 2003/0204515 | A1 | 10/2003 | Shadmon et al. |
| 2003/0217335 | A1 | 11/2003 | Chung et al. |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 | 9/2004 | Walker et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldeway |
| 2005/0149503 | A1 | 7/2005 | Raghavaxhari |
| 2005/0171960 | A1 | 8/2005 | Lomet |
| 2005/0179684 | A1 | 8/2005 | Wallace |
| 2005/0198042 | A1 | 9/2005 | Russell et al. |
| 2005/0262108 | A1 | 11/2005 | Gupta |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | WO 02/063498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

David Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al:"Multiple Generation Text Files Using Overlaping Tree Structures", Computer Journal, Oxford University Press, Surrey, GB. vol. 28, No. 4 Aug. 1985, pp. 414-416.

* cited by examiner

ACCESSING DATA IN AN INTERLOCKING TREES DATA STRUCTURE USING AN APPLICATION PROGRAMMING INTERFACE

BACKGROUND OF THE INVENTION

1. Field of Invention

The invention generally relates to application programming interfaces (APIs). More particularly, the invention relates to an API set for use with data contained in an interlocking trees datastore.

2. Description of Related Art

Practically, an API (application programming interface) is any interface that enables one program to use facilities provided by another, whether by calling that program, or by being called by it. At a higher level still, an API is a set of functionality delivered by a programming system, and as such the mix of APIs in a particular system tells you what that system can do. APIs are known in the art. For example, U.S. Pat. No. 6,760,911 B1, entitled "Messaging API Framework," teaches methods for allowing C++ applications to communicate through an MQ Series gateway with CORBA-based applications. While producing satisfactory results, the methods used are not useful for KStore technology.

The KStore technology addresses the problems associated with traditional relational databases. As described in U.S. patent application Ser. No. 10/385,421, entitled "System and method for storing and accessing data in an interlocking trees datastore" (published as US Patent Application Publication No. 20040181547 A1 Sep. 16, 2004 and for which U.S. Pat. No. 6,961,733 was granted Nov. 1, 2005) and Ser. No. 10/666, 382, entitled "System and method for storing and accessing data in an interlocking trees datastore" (published as US Patent Application Publication No. 20050076011 A1 Apr. 7, 2005 and for which U.S. Pat. No. 7,158,975 was granted Jan. 2, 2007) the KStore data structure can eliminate the distinction between transactional data and stored (relational) data.

With the development of the KStore technology, there is a need for application programming interfaces to connect applications, data sources, and GUIs with the interlocking trees datastore.

All references cited herein are incorporated herein by reference in their entireties.

BRIEF SUMMARY OF THE INVENTION

A method for transmitting information in a KStore system having a KStore with at least one K path, an application programming interface and an application layer wherein the information is transmitted between the KStore and the application layer includes transmitting the information between the KStore and the application layer by way of the application programming interface. The KStore includes a plurality of K paths and may be constrained by way of the application programming interface with at least one constraint to provide at least one selected K path of the plurality of K paths. The constraining provides a set of selected K paths and the KStore is focused to provide a further set of selected K paths in accordance with the set of selected K paths. At least one KStore parameter is determined in accordance with the selected K path to provide at least one determined K parameter. The constraining of the KStore includes traversing the at least one selected K path.

This invention extends the flexibility and ease of use of interlocking trees datastore, particularly of the type described in U.S. Patent Application Nos. Serial Nos. 20040181547, 20050076011, 20050165749 and 20050165772 entitled "System and method for storing and accessing data in an interlocking trees datastore" and has particular applicability to the use of systems incorporating such KStore data structures as is found in U.S. patent application Ser. No. 10/879, 329 entitled "Functional operations for accessing and/or building interlocking trees datastores to enable their use with applications software." These patent documents are incorporated in their respective entireties by this reference thereto.

While the prior patent documents describe both a KStore structure and a system for enabling use of a KStore with various applications for learning and querying, the system still requires an API to allow for the development and execution of multiple application programs without the possibility of any of the different applications corrupting the interlocking trees datastore and without the need for the application developers to have detailed understanding of the processes required to traverse and return address locations within the interlocking trees datastore.

This API will service calls to the interlocking trees datastore engine from applications, to construct, query and maintain the interlocking trees datastore, without ever returning addresses that would allow direct access to the interlocking trees datastore.

The invention can also provide security functions such as validating the KStore identity and that the calling routine has access. The inventors herein have determined that a number of processes ought to be created to facilitate use of KStore and queries of them. These functional objects that make queries of particular kinds can be called individually out of a set of such objects as needed, if they are put together into a system. We call them "functional categories." We have previously described a system for supporting a KStore and suggest using it or something like it to support this set of functional categories.

Accordingly, a set of such functional categories appropriate to specific kinds of queries have been created and new sets of them can be created using the ones described in detail herein. Because these functional categories can be defined in various ways for particular needs, we also describe with some particularity preferred embodiment routines, and subcomponents of such routines in some detail.

As those of ordinary skill in these arts will appreciate, these functional categories in current technology paradigms are best implemented as software routines, but as those of skill in these arts will also appreciate such objects can easily be translated into hardware implementations without experimentation as to how to build them once such objects are described as set forth within.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The organization of this patent is divided into sections as follows. The first section details a preferred embodiment KStore system for which the inventive functional objects will be operable, as sets or groups or individually, depending on the particulars of any given instance of such a system. Nearly all of this first section description is already found in U.S. patent application Ser. No. 10/879,329, entitled "Functional operations for accessing and/or building interlocking trees datastores to enable their use with applications software." This section also defines how we use the term "Functional Categories," as well as some other terms of interest for describing the invention.

The second section is broken into parts. There are four parts, each describing a functional category and in each there are specific exemplary routines described that implement this functional category. Particular preferred embodiments may use just one of these types or even only one of the ones of these one types, although it will likely be found that combinations of functions needed to produce smoothly functioning efficient query response systems will have many of these and perhaps other yet to be defined ones of some or all of these types.

Part 1—Description of KStore System for Use with This Invention

It should be understood that there are other possible system configurations for use of this invention, however, in preferred embodiments it can be used with the system described herein.

Figure 1:
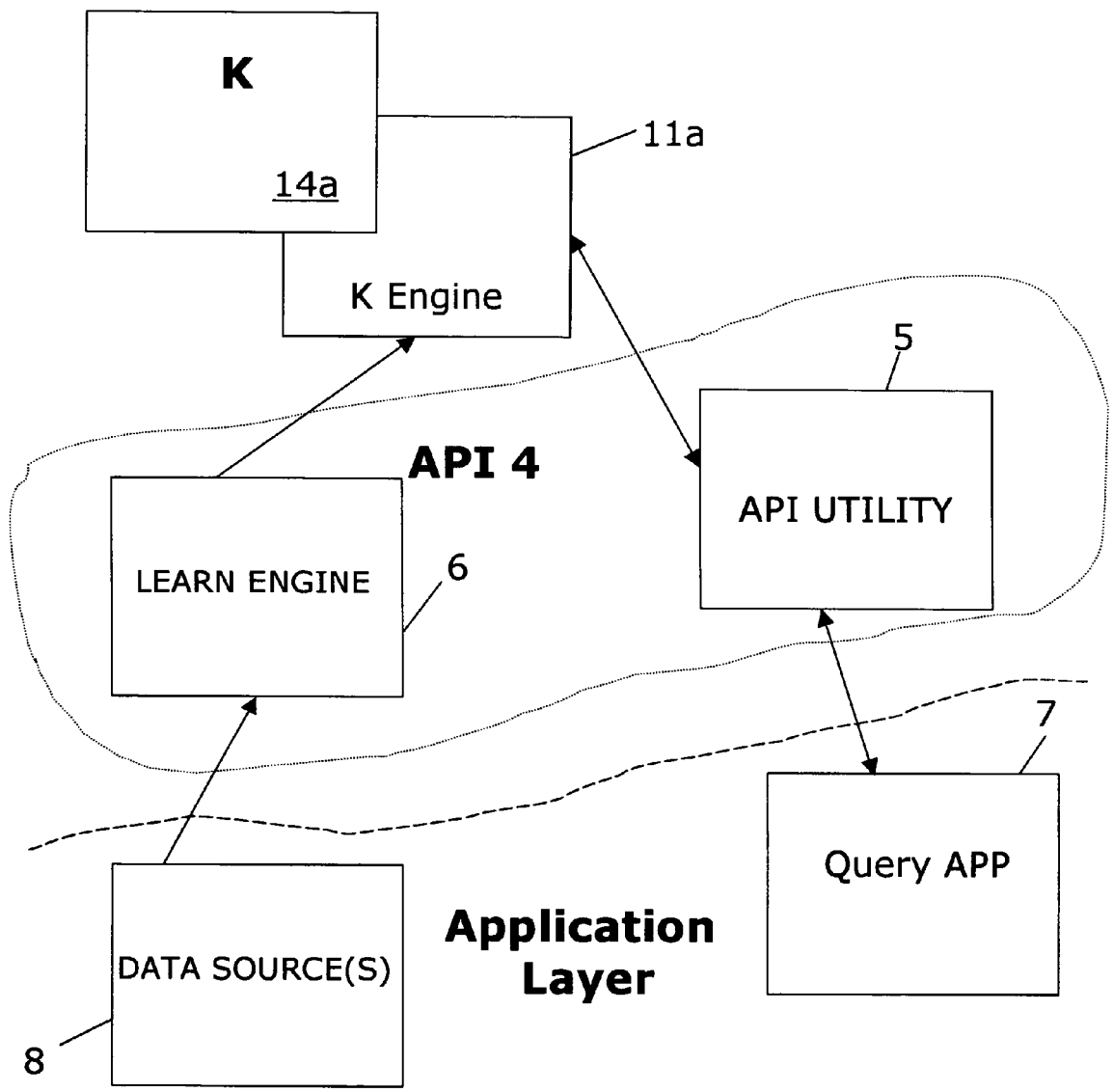
FIGS. 1 and 2 are block diagrams illustrating the interaction of the main components that can be used in preferred embodiments of this invention.

Refer first to FIG. 1 which illustrates a KStore system having a KStore 14a in a preferred embodiment environment in which a K Engine 11a provides the only connection of the K 14a to the rest of the world. It should also be noted that there can be more than one K Engine, similar to the one K Engine 11a in the illustration, providing access to the KStore 14a. In turn, the K Engine 11a can be addressable by entities such as API Utilities 5 and Learn Engines 6 which manage and handle threads in cooperation with the resources of a computer system (not shown) in which they operate. In the preferred embodiments of the invention learn functions for permitting learning by the K 14a can be performed in the learn engine 6, in a learn utility or other areas of the KStore system. The API Utilities 5 and Learn Engines 6 can be within the API 4, which can be disposed between the K 14a and the application space for transmitting information between the API Utilities 5 and the Learn Engines 6. The application space can include any applications such as data sources 8 or query application 7. Typically, the computer system will be a server although a single personal computer can be used in some implementations of K.

The outside world, in our preferred arrangements has access to the K structure only through these API Utilities and Learn Engines. The API Utilities and Learn Engines therefore can validate whether a person using an application should have access to the K 14a or to a specific portion of the K 14a in order to prevent unauthorized querying, updating, or management of the K 14a. Additionally, the API Utilities can validate data sources 8.

The API Utilities and Learn Engines are accessed by the outside world through an applications layer. In order to maintain the integrity of the information in the K14a, the API 4 does not pass any internal K information to the application layer that would permit the applications to traverse or alter the K14a. For example, no pointers or node locations are passed to the applications layer. In addition, no information about the structure of the nodes or how the connecting structures are organized are passed to the applications layer. Note that the U.S. patent application Ser. No. 10/879,329 describes how the API Utilities and the Learn Engine operate and are accessed, while this patent covers the APIs in more detail.

Applications such as GUIs, databases, and any other type of program or interface which could provide data or request information can be hosted in this applications layer. FIG. 1 illustrates this structure but is drawn to avoid the explicit delineation of threads and layers, to indicate to the reader that the hosting environment is inherently flexible in its nature.

Figure 2:
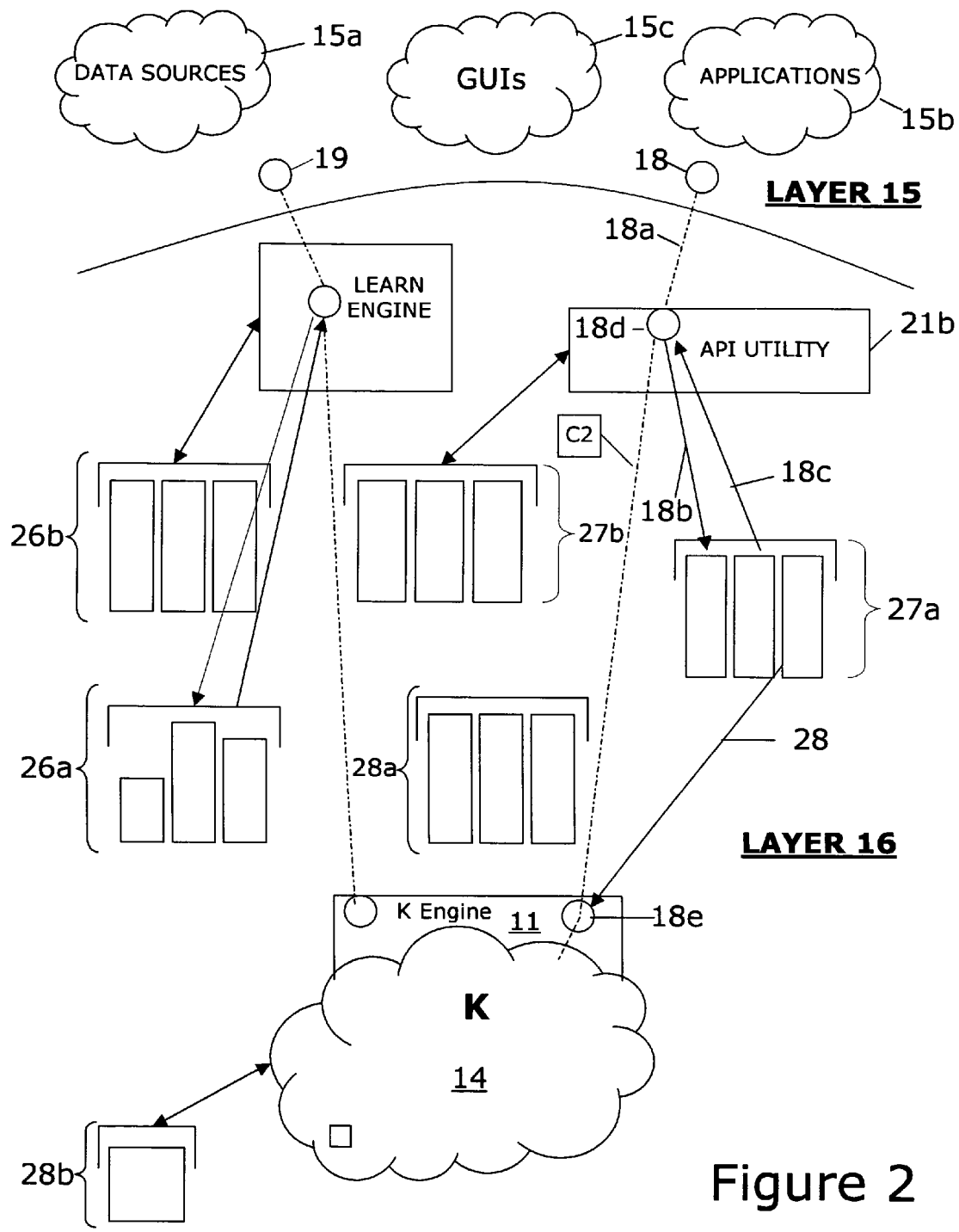

Specifically, in FIG. 2 we have illustrated a KStore K 14, as a cloud, situate in a computer memory system (not shown). This K 14 is accessible by a K Engine 11. There could be multiple K Engines. An applications layer 15 may contain various forms of GUI (Graphic User Interface) interfaces 15c for users to send and receive data such as queries and replies. This layer 15 may also contain data sources 15a, or programs (which can be in or associated with the data sources) of cloud 15a, which can provide data to build KStore K 14. Also this layer 15 can contain application programs 15b which applications programs may make queries or provide data to be transmitted to K. Additionally, it should be noted that maintenance and administrative functions can also be performed, for example, through applications or GUI's. The components of a layer 15 can be spread across the internet, with parts of GUIs and applications hosted among various computer systems and networks if desired, or it can all be local to the same computer system server which hosts K and the K Engine, as well as the API Utilities.

Any time data is provided to K or any time a search is done of K, we often say we are calling or sending a message to the K Engine. It should be noted that some of the features of the API utilities may be encompassed by the K Engine, depending on how the system is built. In its most easy to understand form the K Engine is kept in as simple a condition as possible. For example, the K Engine may pass only particles into a K and return pointer addresses to whence the particle went. It is important to note that K pointer addresses are never passed through APIs to layer 15. In given implementations, the K Engine can assume some of the functions of the API Utilities if desired and/or efficient.

In FIG. 2, layer 16 can contain at least one instance of API Utilities 21b. We can simply call an API utility an interface object. This interface object contains (or is) the set of programs (or potentially hardware or some other as yet unidentified medium) that enable calls for information, maintenance, or data input 18, to obtain information from the K regardless of the form the queries are in. This layer 16 may handle multiple threads, contain multiple instances of the Learn Engine, and multiple instances of the API Utility and is explained in detail in U.S. Pat. No. 10/879,329.

Figure 3:
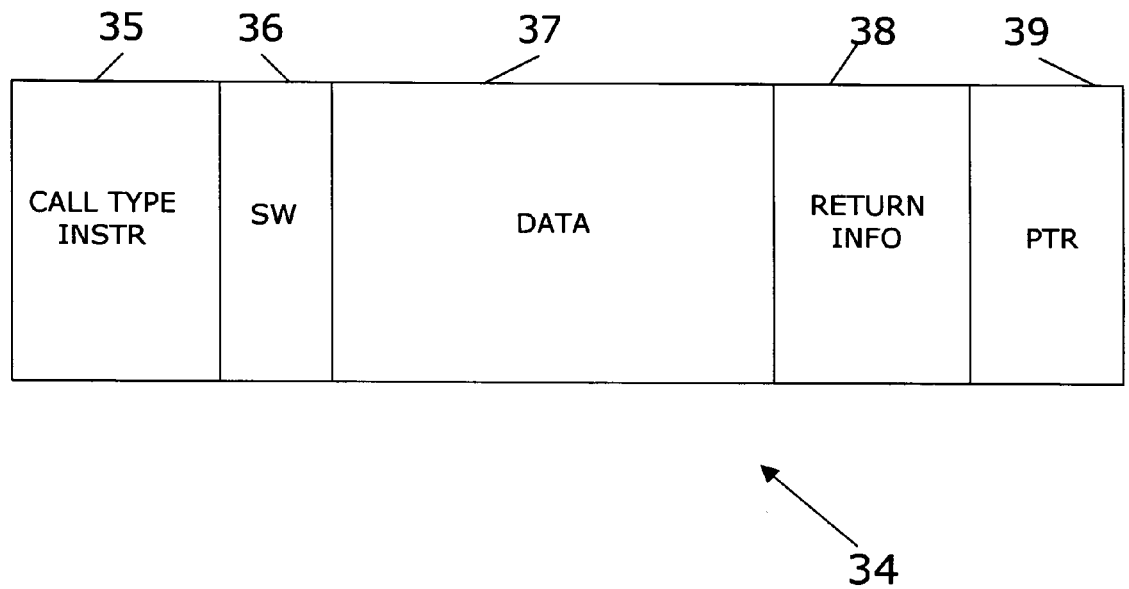
FIG. 3 is a block diagram of a message in instruction-word format.

The utility procedures of the API utility can produce calls to the K Engine or internal utility procedures. Calls themselves, that is, the requests from the API Utility objects can be very simple statements or even instruction words. The quickest way to see this is to illustrate it as an instruction word or message 34 of FIG. 3. We use the concept of the instruction word for purposes of a teaching illustration. As such, the instruction word could have an instruction type (Call) 35, but in most embodiments this is not needed because the K Engine can return a current location pointer regardless of the purpose of the call.

Thus, the basic components of a functioning system for supporting uses of a KStore are described, and from these, numerous things can be accomplished.

API

Figure 4:
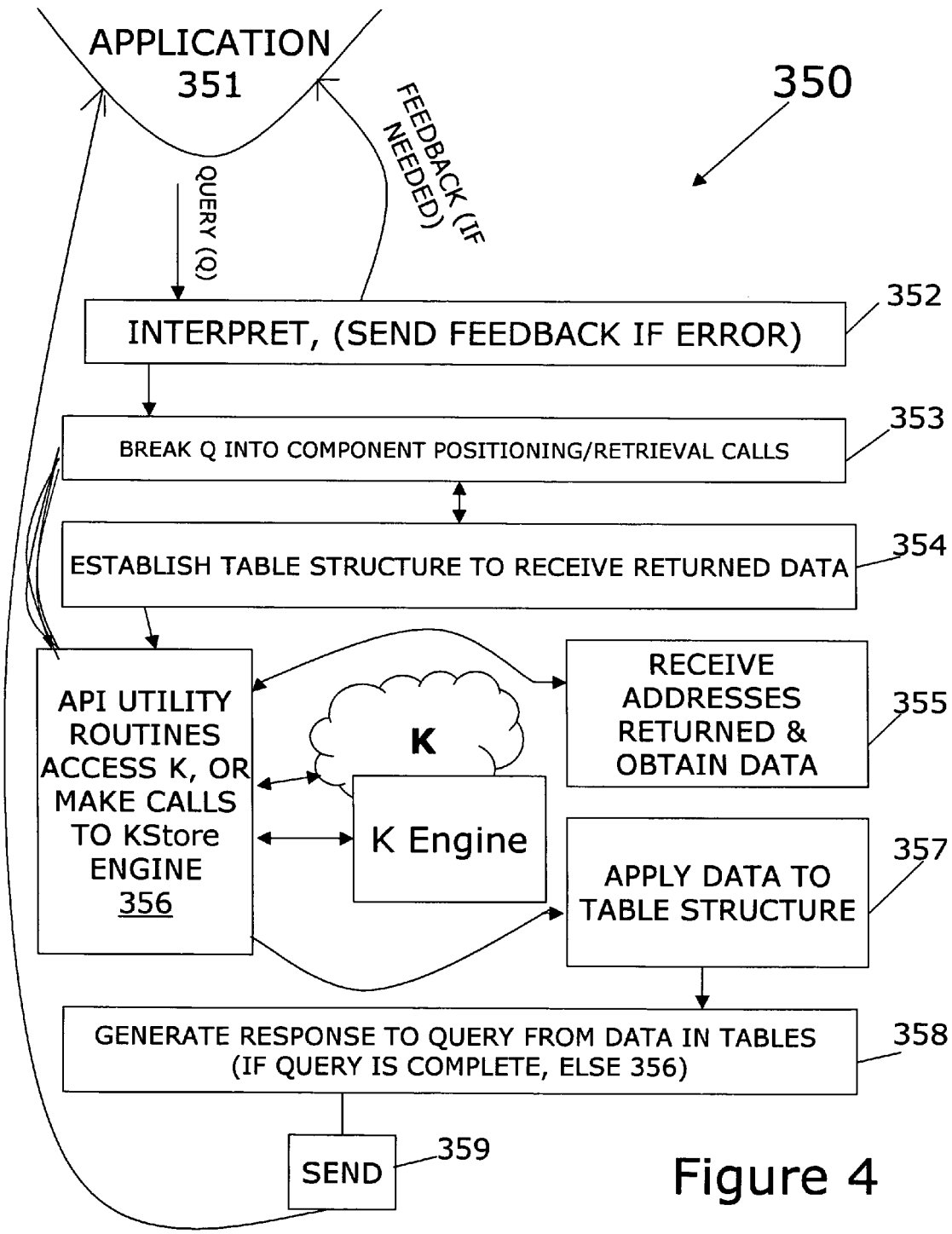
FIG. 4 is a flow chart of an application query handling process of an API Utility in accord with a preferred embodiment of the invention.

Refer first to FIG. 4 in which the generalized process 350 for handling queries is illustrated as a flow chart. The application 351 (or a GUI being accessed by a user) provides a query Q formulated to seek a result. This query Q could be in SQL format or any other format that can be parsed, such as for example natural language. An example might be "Was anything sold by Bill in PA?" The query assumes that the requested information exists in the K that is loaded at this moment.

If the query Q is not understood or otherwise erroneous, a feedback mechanism may be provided to ask the application or the user to reformulate the query.

Thus, the next step in this preferred embodiment is to have the applications layer interpret 352 of FIG. 4, and provide feedback or error message if required. The error processing can include, for example, locating invalid characters, such as letters in a field to be added. Once the query is established, the components of the query need to be established. For the question just asked, "Was anything sold by Bill in PA?" we need to find all the records in the K that have Bill in them, and focus on ones that have sold in them as well as having PA in them. If there are any such records, a positive reply is in order; otherwise, a negative reply is in order.

This comprises the breaking down of the query into component positioning and retrieval calls 353. At the base level the query is broken down into calls to 356 the K Store Engine, which finds its way into the K via the current location pointers. This information is returned to the API utility, which organizes the information and makes additional queries until the query Q is satisfied. The API Utility may go directly to addresses in the computer system memory to retrieve information consisting of other addresses or root node data in process 355. The API Utility applies the result to a table structure 357 that it creates 354 to handle the information retrieved. When the response is completed, it is formatted 358 to send as a reply which can be in the query language used. However, until it is complete, the API Utility can continue to make calls to the K Store Engine. When the query is completed, the formatted, response can be sent 359 back to the application 351.

In some preferred embodiments, we have two types of API Utility components to the KStore system. One, an administrative API Utility component, is for maintenance, initiation, and change function support, which enables the user or a program to modify the various system components such as, by setting switches, state variables, designating data sources, modifying metadata or doing other things of an administrative nature. The other API Utility type, of interest here, is used for queries.

Figure 5:
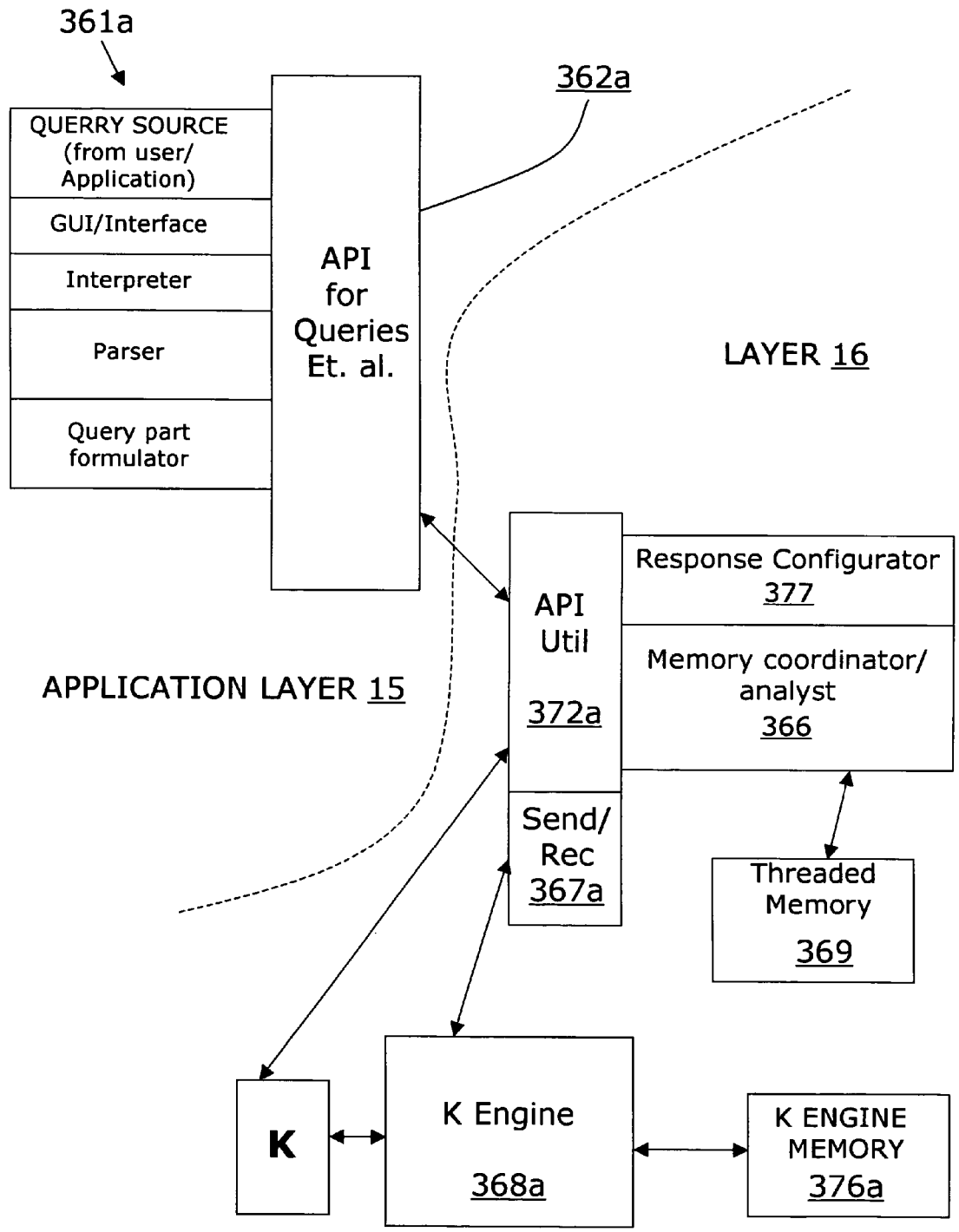
FIG. 5 is a block diagram of a preferred embodiment API Utility component.

FIG. 5 illustrates the access to the API Utility object for handling queries, updates and the like. Again, nearly every item 361*a* in the applications layer may be configured by a system designer at will, so long as they communicate through a set of hooks or addresses provided by an API, here API 372*a*. The user or application will use such components in the applications layer to process a query through a GUI or other interface as shown in 361*a*. An Interpreter, also in 361*a*, can advantageously be provided to interpret the queries and may send feedback (not shown) if required to understand or comprehend the query. A parser within 361*a* can be used to determine the nature of the query relative to the algorithms this instance of API Utility has for handling queries. It will select which one(s) of API Utilities it will use.

The query can be broken down into its component parts, perhaps by a query part formulator. These query parts can call the relevant API Utility component routines in 372*a*, which can call the K Engine 368*a* via the send/receive subcomponent 367*a* to locate a position in the K structure, access the K structure directly or update appropriate memory within the API Utility space. The K Engine can look to its own associated memory 376*a* to determine if what is sent is on the sensor list, how to respond to it, and the like.

Other routines can operate to coordinate memory in area 366 of the API Utility 372*a* and to stand ready to analyze location information returned responsive to each query part. These other routines are designated subcomponent memory coordinator/analyst 366, and operate to store and retrieve associated data in a memory for handling a query thread in thread memory 369. The API Utility 372*a* may keep records of previous positional information generated by earlier calls (i.e., current location counters returned by the K Engine in 368*a* in response to calls), it can go back with a new call using previous positional information to process current calls it needs to make to find higher levels of information such as the count of a subject variable within a context. The memory coordinator/analyst 366 can also coordinate information previously retrieved from the previous calls that it may have stored in its thread memory 369 and may produce the final result needed by the Response Configurator 377 to generate the answer to the query.

Part 2—Functional Groups

The API set of the present embodiment of the invention can be divided into at least four functional categories of APIs:

1. Support Functions
2. Analytic Calculation Functions
3. Monitoring Functions
4. Administration Functions The following is an example of API procedures within each functional category that can be used to access a KStore interlocking trees data store. Following this list is an explanation of representative API procedures.

Functional Category 1—Support Functions

The following procedures are ways to access a KStore such as the KStores 14, 14*a*.

Maintaining the client interface
Connect
QueryInterfaceByName
Retrieving values and information from the K
Columns
Fields
Variables
GetFieldsWithCount$_{13}$ XML
GetFieldsXML
GetCollectionWeight
GetCount
GetLongCount
GetDistinctCountList
GetDistinctCountListXML
Setting Constraints AddANDGroup
AddNOTGroup
AddORGroup
AddConstraint
UpdateConstraint
Setting a Focus
Focus
UpdateFocus
FocusColumn
UpdateDistinctCount
Returning Data Format
K Data Structures
  FieldName
  FieldValue
  Result
  IsAlphanumeric
  Type
  Text
  Compare
  IsMask
  Init
  IKData:Initialize
K Collection Structure
  Item
  NewEnum
  Count
  Init
  Add
  Remove
  Clear
Functional Group 2—Analytic Calculation Functions The following procedures are different ways to retrieve analytics from the KStore interlocking trees data store.
  DecisionTree
  DecisionTree_XML
  Rules
  Rules_XML
  PredictSingleVariable
  PredictSingleVariable_XML
  Classify
  Classify_XML
  BayesClassify
  BayesClassify_XML
  RecordExplorer_3
  RecordExplorer_XML
  RecordExplorer_XML_2
  RecordExplorer_XML_3
  ResultListCount
  ResultListCount 2
  SumColumnLong
  SumColumn_XML
  QuestionK
  QuestionK_XML
  DistinctRecordCount
  RecordCount
  KCmd_XML
Functional Group 3—Monitoring Functions The following procedures are ways to monitor the KStore data store.
  Event
  GetEvent
  SaveEvent
  DeleteEvent
  ListEvents
  StartEvent
  StopEvent
  SuspendEvent
  ResumeEvent
  Initialize
  Stop
  Status
  Register
  Unregister
  IsRegistered
  Trigger
  XML
  GetAdviseCookie
  GetMemory
  SetMemory
  RunQuery
  QueryStats
  GetQuery
  SaveQuery
  DeleteQuery
  ListQueries
  Broadcast
  Probability
Functional Group 4—Administration Functions The following procedures are listed within functional categories and are different administration functions.

Miscellaneous APIs for Initializing and managing the structure and determining the specific features for the K.
  StartEngine
  StopEngine
  RenameEngine
  KeepEngineRunning
  Save
  Load
  Reset
  Name
  Initialize
  QueryInterfaceByName
  setSwitches
  Persistence
  SaveK
  RestoreK
  DeleteK APIs for reading and processing new information to be added to the structure:
  Learn
  Append
  Update
  Maintaining MetaData
  AddColumn
  AddVariable To illustrate the present invention, two figures are used to show a method to administer and to use a KStore structure. As the figures are explained, one representative API procedure within each functional group is explained in detail.

Figure 6:
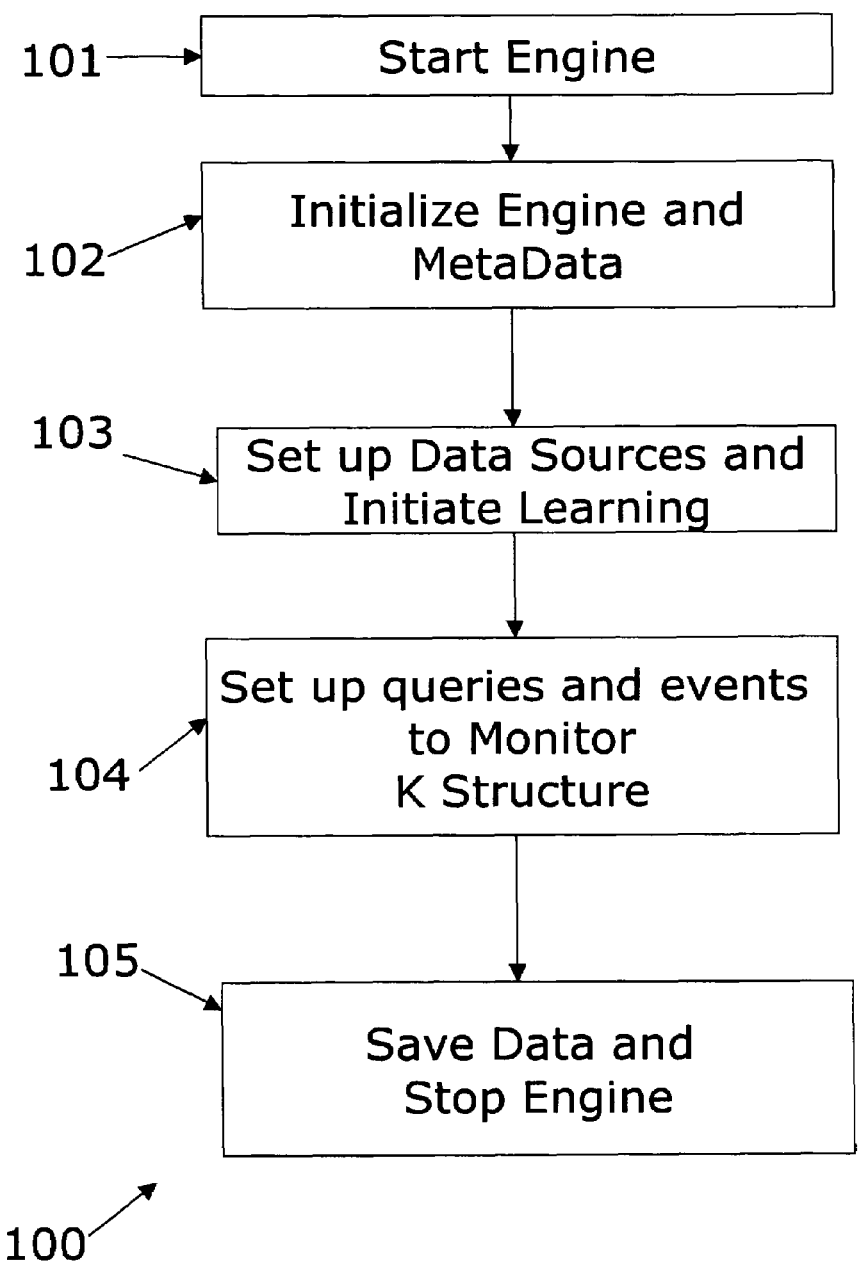
FIG. 6 is a flow chart of system administration steps for K in accord with preferred embodiments of the invention.

Refer to FIG. 6. FIG. 6 is a flow chart of system administration method 100 showing steps for K in accord with preferred embodiments of the invention. In this figure, a KStore administrator starts the KEngine 101. The API procedure for this step can be from the Administration Functions functional category and can be called "StartEngine" procedure.

Figure 7:
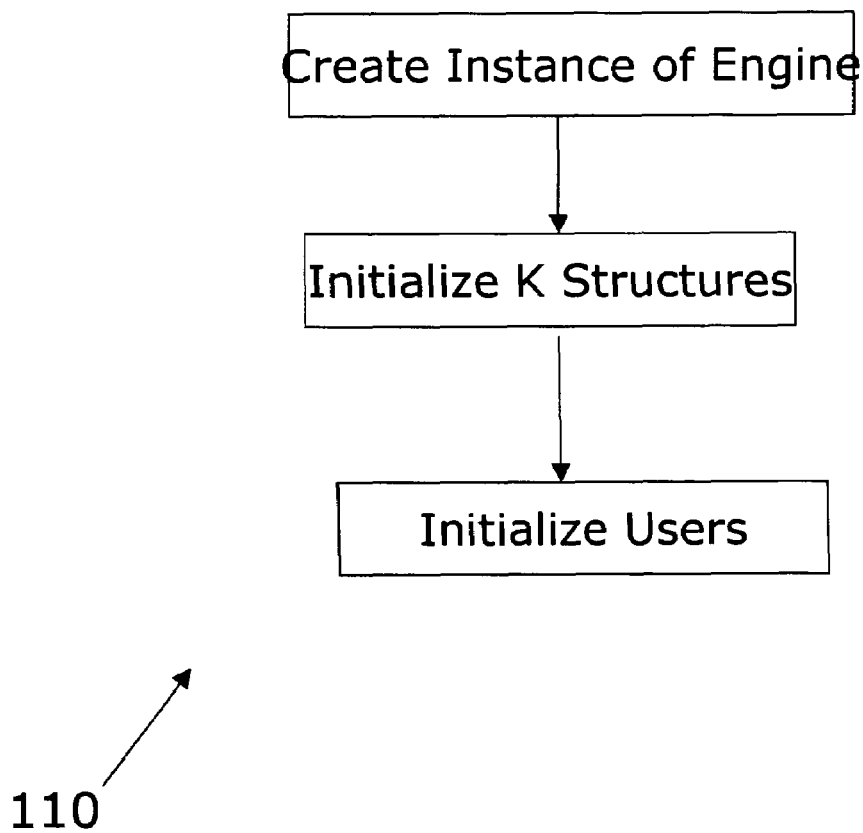
FIG. 7 is a flow chart showing an exemplary flow diagram of the StartEngine method in accord with preferred embodiments of the invention.

To illustrate the present invention, FIG. 7 shows an exemplary flow diagram 110 of a StartEngine method. The StartEngine method initializes a specified instance of a K with a default set of sensors.

HRESULT StartEngine ( BSTR name);

Parameters

Name [in] BSTR specifying the name of the K instance to initialize. Example: "Unisys Marketing Model".

Return Values

| Value | Meaning |
|---|---|
| S_OK | The method was successful. |
| E_FAIL | An unspecified error occurred. |

After the KEngine is started as shown in FIG. 7, the user can use certain procedures to set up what K should look like and then initialize the structure 102. In this example "Initialize" and "setSwitches" and "AddColumn" procedures can be used. Since these procedures are also in Administration Functions functional category, no procedures will be discussed in detail.

The next step is to setup data sources and initiate learning by the KStore as shown in 103. To setup data sources the user uses "AddDataSource" procedure. To initiate learning, the user can use the "Learn" procedure. Again, since these procedures are in Administration Functions, no procedures will be discussed in detail.

Then queries and events used to monitor the K structure are set up 104. "StartEvent" procedure from Monitoring Functions functional category can be used.

Figure 8:
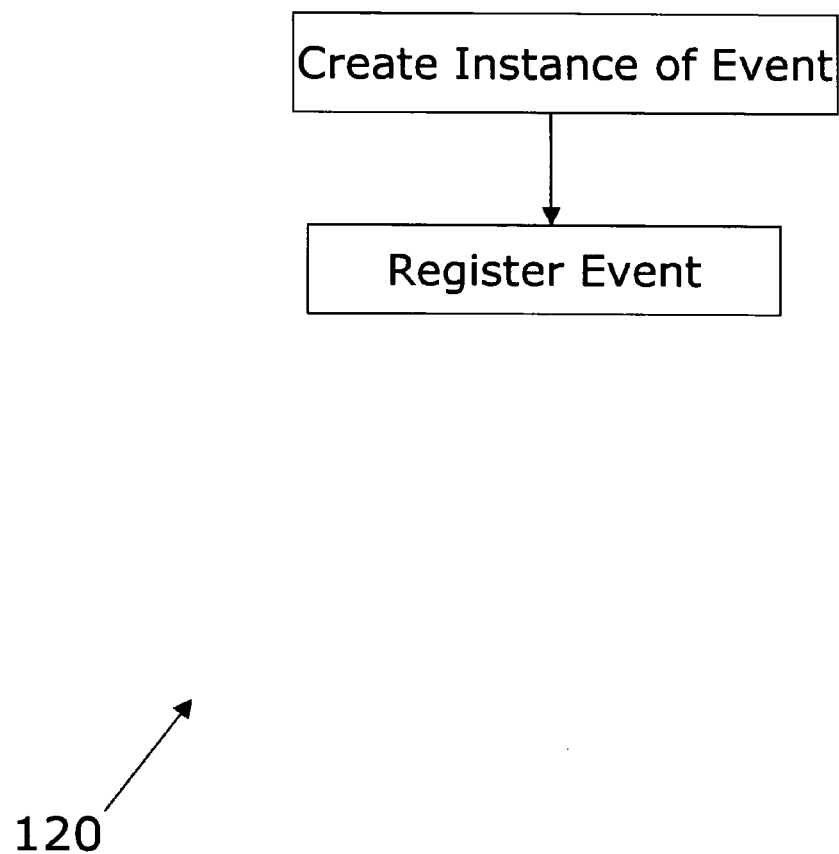
FIG. 8 is a flow chart showing an exemplary flow diagram of the StartEvent method in accord with preferred embodiments of the invention.

To illustrate the present invention, FIG. 8 shows an exemplary flow diagram 120 of the StartEvent method.

The StartEvent method starts monitoring the specified event.
HRESULT StartEvent(
BSTR name
);
Parameters
name [in] Specifies the name of event to start monitoring.
Return Values

| Value | Meaning |
|---|---|
| S_OK | The method was successful. |
| S_FALSE | The specified event was not stopped. |
| E_FAIL | An unspecified error occurred. |

Requirements: A KStore Engine has been started.

The final step in the administrative process shown in FIG. 6 is to save the data and stop the engine 105. Again, since these procedures are in Administration Functions functional category, none will be discussed in detail.

Figure 9:
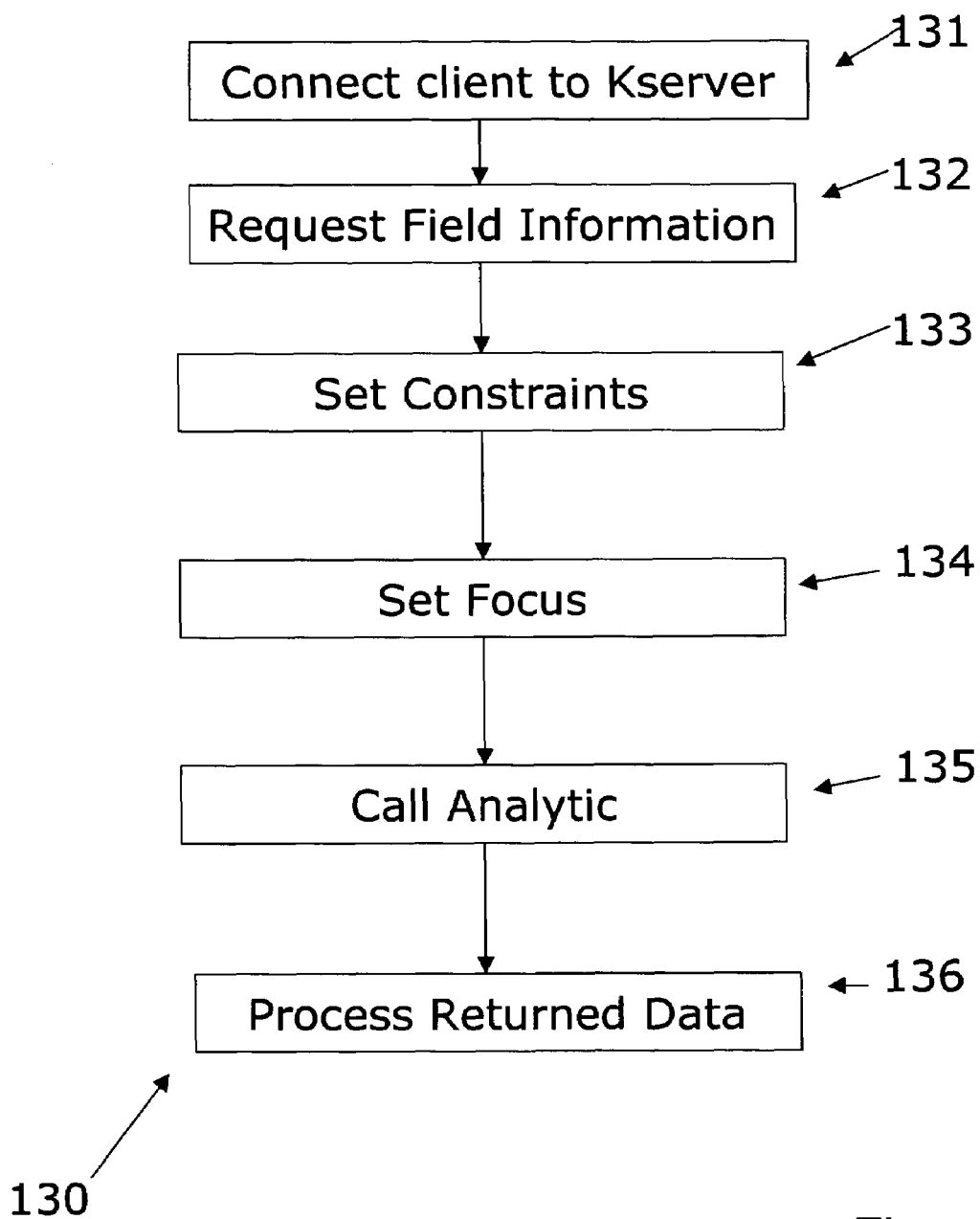
FIG. 9 is a flow chart showing how a KStore user interacts with the K in accord with preferred embodiments of the invention.

Refer to FIG. 9. FIG. 9 is a flow chart 130 of how a KStore user interacts with the K in accord with preferred embodiments of the invention. In this figure, a KStore user can connect to the KServer 131. The API procedure for this step can be from Support Functions functional category and can be called "Connect" procedure.

Figure 10:
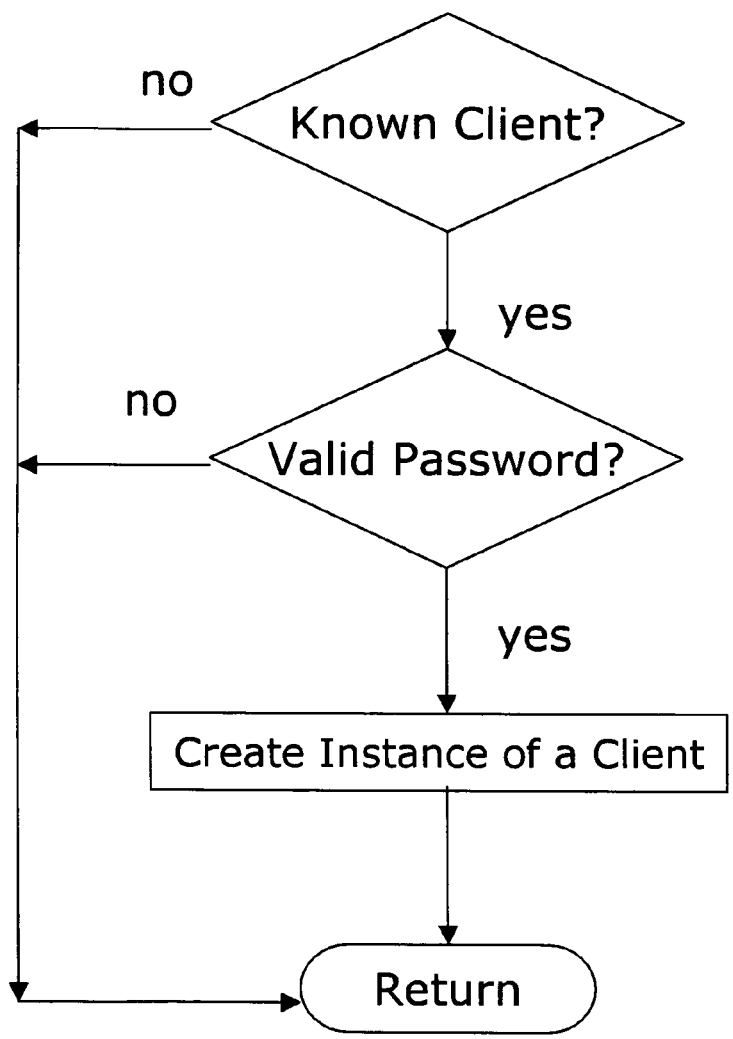
FIG. 10 is a flow chart showing an exemplary flow diagram of the "Connect" procedure in accord with preferred embodiments of the invention.

To illustrate the present invention, FIG. 10 shows an exemplary flow diagram 140 of the "Connect" procedure.
Connect
The Connect method establishes a communication path with the KStore Engine.
HRESULT Connect(
BSTR engineName;
);
Parameters
engineName [in] This is the name of the engine to connect to.
Return Values

| Value | Meaning |
|---|---|
| S_OK | The method was successful. |
| E_FAIL | Fails to connect. |

Requirements: The Engine object has been created and started up.

Next in the client flow shown in FIG. 9 field information is requested 132 followed by setting constraints 133, and setting focus 134. Since theses procedures are in Support Functions functional category, they will not be discussed in detail.

Next in the client flow shown in FIG. 9, the KStore analytics are called 135. The example API procedure for this step can be from Analytic Calculation Functions functional category and can be called "PredictSingleVariable" procedure.

Figure 11:
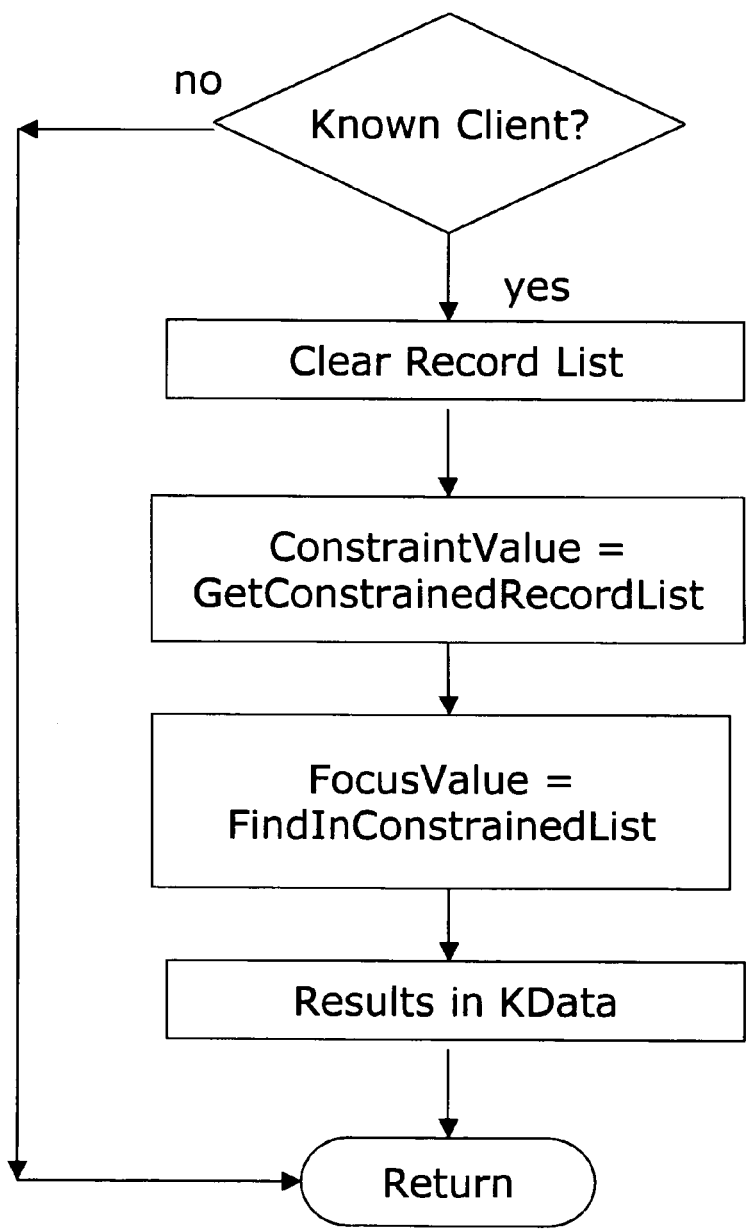
FIG. 11 is a flow chart showing an exemplary flow diagram of the "PredictSingleVariable" procedure in accord with preferred embodiments of the invention.

To illustrate the present invention, FIG. 11 shows an exemplary flow diagram 150 of the "PredictSingleVariable procedure.
PredictSingleVariable
The PredictSingleVariable method calculates the probability for the specified focus and retrieves the result in a KCollection.
HRESULT PredictSingleVariable(
IKCollection **ppVars
);
Parameters
ppVars
[out, retVal] KCollection used to return results.
Return Values

| Value | Meaning |
|---|---|
| S_OK | The method was successful. |
| E_INVALIDARG | Validation of client failed. |
| E_POINTER | An invalid IKCollection pointer was used. |

Requirements: The focus field is set, and constraints, if any, have been previously processed.

In this example as shown in FIG. 9, the final step is to process the data that has been returned to the user 136. Since these structures can be from the Support Functions functional category, they will not be discussed in detail.

While the invention has been described in detail and with reference to specific examples thereof, it will be apparent to one skilled in the art that various changes and modifications can be made therein without departing from the spirit and scope thereof.

What is claimed is:

1. A method for transmitting information in a KStore system having a KStore, the method comprising:
   transmitting information between said KStore and an application layer by way of an application programming interface;
   processing said information within said KStore; and
   returning result information between said KStore and said application by way of said application programming interface;
   wherein the KStore comprising:
   an interlocking trees datastore situated within memory accessible to an application programming interface running in a computer comprising root nodes and non-root nodes organized into a plurality of connected trees, each node in the interlocking trees datastore comprising a Case pointer pointing to a first portion of a non-root node, a Result pointer pointing to a second portion of the non-root node, a pointer to an asCase list;

an asCase tree comprising a first root and at least one of a plurality of non-root nodes, at least one asResult tree comprising a second root node and at least one of a plurality of non-root nodes common with the nodes of the asCase tree;

at least one K path;

an application layer;

the application programming interface coupled to said KStore and said application layer wherein information is transmitted between said KStore and said application layer by way of said application programming interface;

the asCase list comprising a linked list of nodes for which the node is a first portion and a pointer to an asResult list;

the asResult list comprising a linked list of non-root nodes for which the node is a second portion;

the at least one non-root node comprising a first Case node and at least one of a plurality of asResult trees;

the at least one non-root node common with the nodes of the asCase tree comprising a first Result node, the nodes of the interlocking trees datastore including at least one elemental node representing a dataset element, at least one non-root node; and the at least one non-root node comprising a first subcomponent node and at least one end product node; and the at least one K path comprising a portion of a tree of the interlocking trees datastore, said portion determined by at least one of said Case pointer, said Result pointer, said asCase list pointer and said asResult list pointer.

2. The method for transmitting information in a KStore system of claim 1, wherein said KStore includes a plurality of K paths further comprising constraining said KStore by way of said application programming interface with at least one constraint to provide at least one selected K path of said plurality of K paths.

3. The method for transmitting information in a Kstore system of claim 2, wherein said constraining provides a set of selected K paths further comprising focusing said KStore to provide a further set of selected K paths in accordance with said set of selected K paths.

4. The method for transmitting information in a KStore system of claim 2, further comprising determining at least one constraint in accordance with said selected K path to provide at least one determined K parameter via said application programming interface.

5. The method for transmitting information in a KStore system of claim 2, wherein said constraining of said KStore further comprises traversing said at least one selected K path.

6. The method for transmitting information in a KStore system of claim 1, wherein said application programming interface further comprises a learn engine.

7. The method for transmitting information in a KStore system of claim 1, wherein said application programming interface further comprises a learn utility.

8. The method for transmitting information in a KStore system of claim 1, further comprising calling for information from said application layer by way of said application programming interface.

9. The method for transmitting information in a KStore system of claim 8, further comprising querying said KStore in accordance with said information.

10. The method for transmitting information in a KStore system of claim 1, further comprising receiving a query by said application programming interface.

11. The method for transmitting information in a KStore system of claim 10, further comprising breaking said query into query components.

12. The method for transmitting information in a KStore system of claim 1, wherein said application programming interface further comprises an administrative application programming interface component.

13. The method for transmitting information in a KStore system of claim 12, wherein said KStore includes a K Engine, wherein said K Engine provides access by said application programming interface to said KStore further comprising starting said K Engine by said administrative application programming interface utility component.

14. The method for transmitting information in a KStore system of claim 1, wherein said application programming interface further comprises an analytic calculation application programming interface component.

15. The method for transmitting information in a KStore system of claim 14, further comprising performing an analytical process by said analytic calculation application programming interface component.

16. The method for transmitting information in a KStore system of claim 14, further comprising performing a DecisionTree process by said analytic calculation application programming interface component.

17. The method for transmitting information in a KStore system of claim 14, further comprising performing a Bayes classification process by said analytic calculation application programming interface component.

18. The method for transmitting information in a KStore system of claim 1, wherein said application programming interface further comprises memory coordinated by a memory coordinator within said application programming interface.

19. The method for transmitting information in a KStore system of claim 1, wherein said application layer further comprises a graphical user interface.

20. The method for transmitting information in a KStore system of claim 1, wherein said application layer further comprises an information source.

21. The method for transmitting information in a KStore system of claim 1, further comprising:

calling said application programming interface by said application layer application; and generating a call processing thread by said application programming interface in accordance with said call of said application layer.

22. The method for transmitting information in a KStore system of claim 21, further comprising allocating an information storage area by said application programming interface for use by said call processing thread.

23. The method for transmitting information in a KStore system of claim 22, further comprising controlling transmission of particle-related information through said information storage area.

24. The method for transmitting information in a KStore system of claim 1, further comprising preventing internal KStore information from being transmitted from said KStore to said application layer.

25. The method for transmitting information in a KStore system of claim 24, wherein said internal KStore information comprises pointer information.

26. The method for transmitting information in a KStore system of claim 24, wherein said internal KStore information comprises a node location.

27. The method for transmitting information in a KStore system of claim 1, further comprising processing error information.

28. The method for transmitting information in a KStore system of claim 1, further comprising validating access to said KStore for an application.

29. The method for transmitting information in a KStore system of claim 28, further comprising validating access to a portion of said KStore for said application.

30. The method for transmitting information in a KStore system of claim 1, further comprising validating a query request.

31. The method for transmitting information in a KStore system of claim 1, further comprising validating a data source definition.

32. The method for transmitting information in a KStore system of claim 1, wherein said KStore further comprises a static KStore.

33. The method for transmitting information in a KStore system of claim 1, wherein said KStore further comprises a dynamic KStore.

34. A KStore system having a KStore with at least one K path, the KStore system comprising:
   an interlocking trees datastore situated within memory accessible to an application programming interface running in a computer comprising root nodes and non-root nodes organized into a plurality of connected trees, each node in the interlocking trees datastore comprising a Case pointer pointing to a first portion of a non-root node, a Result pointer pointing to a second portion of the non-root node, a pointer to an asCase list;
   an asCase tree comprising a first root and at least one of a plurality of non-root nodes,
   at least one asResult tree comprising a second root node and at least one of a plurality of non-root nodes common with the nodes of the asCase tree;
   at least one K path;
   an application layer; and
   the application programming interface coupled to said KStore and said application layer wherein information is transmitted between said KStore and said application layer by way of said application programming interface;
   wherein:
      the asCase list comprising a linked list of nodes for which the node is a first portion and a pointer to an asResult list;
      the asResult list comprising a linked list of non-root nodes for which the node is a second portion;
      the at least one non-root node comprising a first Case node and at least one of a plurality of asResult trees;
      the at least one non-root node common with the nodes of the asCase tree comprising a first Result node, the nodes of the interlocking trees datastore including at least one elemental node representing a dataset element, at least one non-root node; and
      the at least one non-root node comprising a first subcomponent node and at least one end product node; and
      the at least one K path comprising a portion of a tree of the interlocking trees datastore, said portion determined by at least one of said Case pointer, said Result pointer, said asCase list pointer and said asResult list pointer.

35. The KStore system of claim 34, wherein said application programming interface further comprises a learn engine.

36. The KStore system of claim 35, wherein said application programming interface further comprises a learn utility.

37. The KStore system of claim 34, wherein said application programming interface further comprises an administrative application programming interface component.

38. The KStore system of claim 34, wherein said application programming interface further comprises an analytic calculation application programming interface component.

* * * * *